Dec. 15, 1936.     D. H. WELLS     2,064,511
APPARATUS FOR FILTERING SOLIDS FROM LIQUIDS
Filed Sept. 26, 1934     2 Sheets-Sheet 1
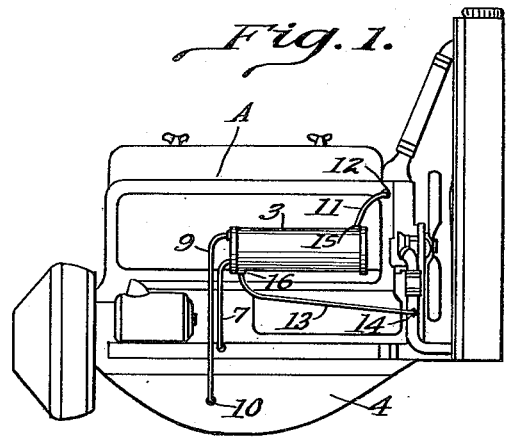
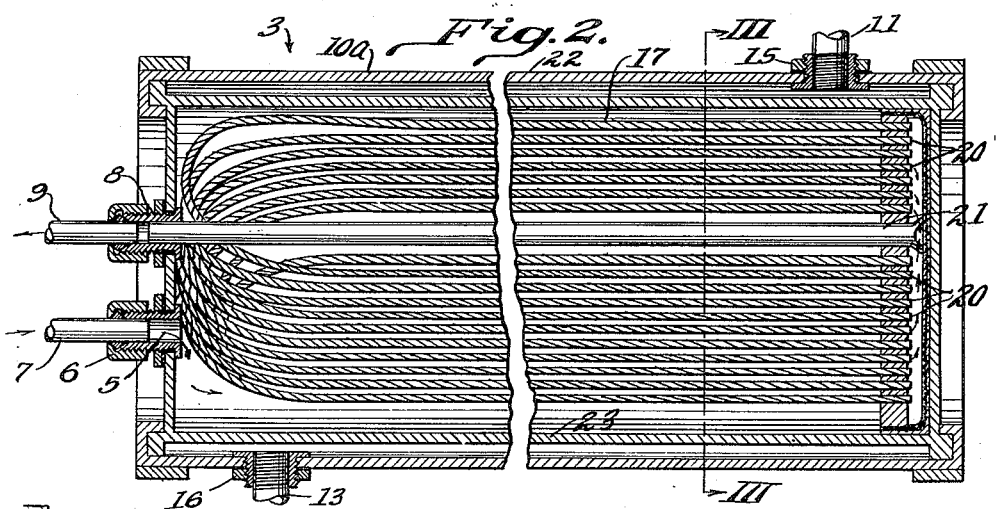
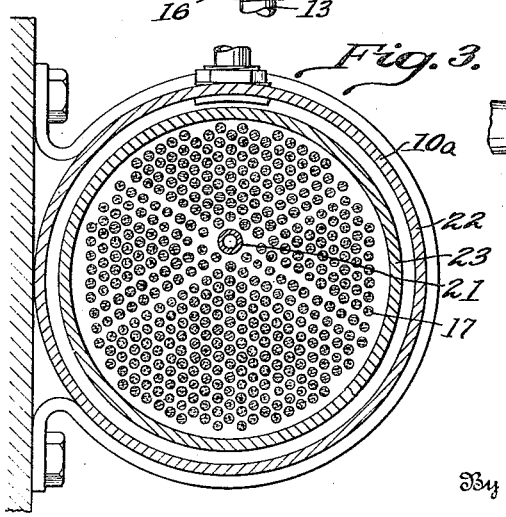
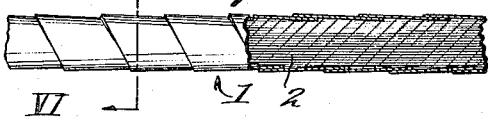
Inventor
Donald H. Wells
By W. S. McDowell
Attorney

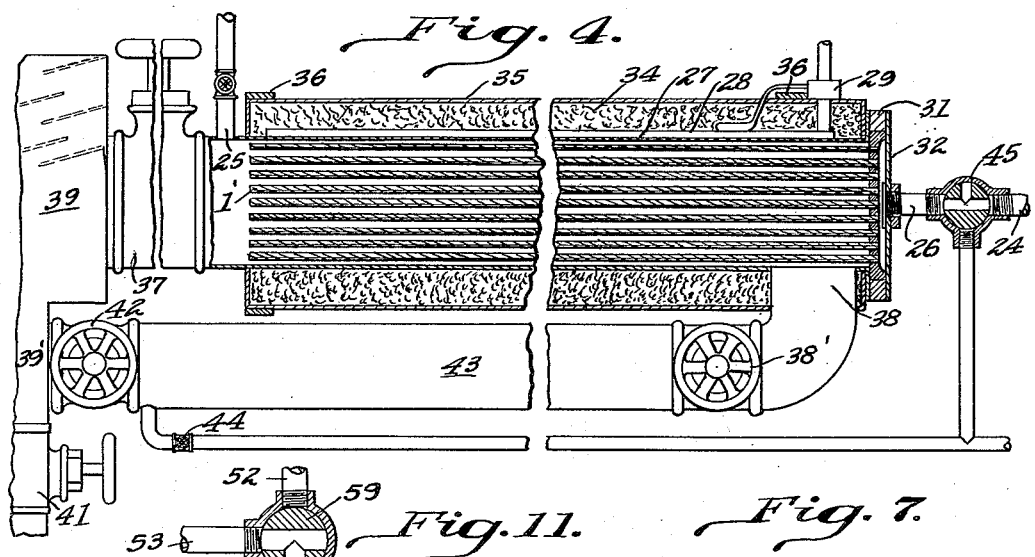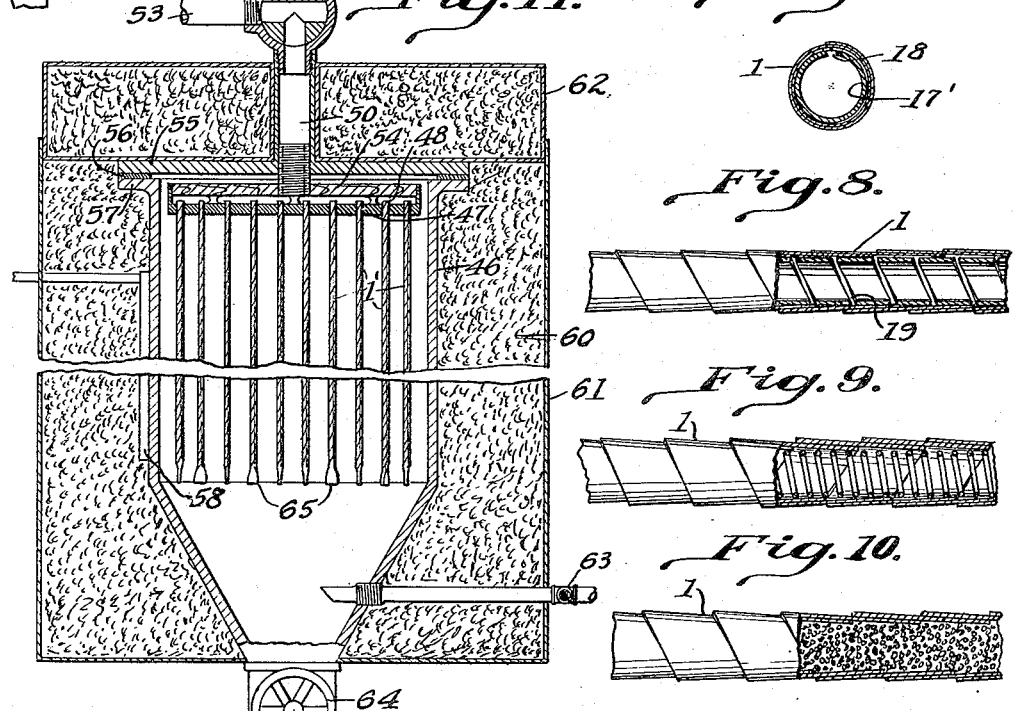

Patented Dec. 15, 1936

2,064,511

UNITED STATES PATENT OFFICE 2,064,511

APPARATUS FOR FILTERING SOLIDS FROM LIQUIDS

Donald H. Wells, Croton, Ohio

Application September 26, 1934, Serial No. 745,597

8 Claims. (Cl. 210—165)

This invention relates to an improved system of filtering liquids to effect particularly the removal of fine solids therefrom and, among other features, the filtering system comprising the present invention provides: (a) a method of heating the oil or other fluid passing through the filter media by means of heated water circulating through a jacket surrounding the media; (b) novel filter media composed of suitable drainage cores provided with an external covering formed from a thin fibrous material such as paper; and (c) the method of removing the filter cake, composed of accumulated solids, from the external surfaces of the filter media to restore the latter after a given period of use to an efficient condition for further filtering operations.

The filtering system comprising the present invention is particularly useful in effecting the removal of deleterious solids from lubricating oils used in the lubrication of various types of combustion engines, such as those employed in trucks, tractors, automobiles, aircraft and motorboats, or in Diesel and other forms of stationary internal combustion engines, the said filtering system being of such nature that it may be employed during active operation of the engine or engines with which it is associated or after removal of the lubricating oil from such an engine. It will be understood, however, that the present filtering system is not limited in its scope to the filtration of engine lubricating oils alone, but is likewise applicable to the filtration of other oils, such as transformer oils, naphthas, fuel oils gasoline, crude oil, oil emulsions, water, weak acids, water solutions and the like, or in fact any filtration problem where the clarity of the filtrate required will warrant the rate obtainable.

An object of my invention is to provide a filter which when in active operation will keep the circulating oil of a motor to which it is attached in a cleaner condition than filters heretofore employed for similar purposes.

It is a further object to warm the oil in a filter in a rapid manner while but a very small flow of oil is taking place through the filter media. In filters with a rapid flow through the filter media, the crank case oil of the motor which becomes warm from contact with the heated surfaces of the motor, displaces the cold oil in the filter because ordinary filtering media are openly porous allowing cold oil, as well as fine solids, to pass through them. In this manner, filters of open porosity become warm even without auxiliary heating. Filters of fine porosity, that produce brilliant filtrates, require auxiliary heating to be most effective, and since the present invention belongs to the latter class of filters, it is a further object thereof to provide such auxiliary heat by means of a water jacket which surrounds the filter media and through which jacket water from the engine cooling system is circulated, in order that the oil undergoing filtration, and passing slowly through the filtering media, will be maintained at an elevated temperature of about 140° F.–180° F. to secure the most efficient operation of the system.

Another object of the invention is the provision of a novel filtering medium which comprises a freely flexible twine-like body formed to include a central drainage core and an outer relatively thin-walled covering of a finely porous fibrous material, such as paper, so that when said filtering medium is placed in a fluid-tight casing, the same will function to remove solids from liquids forced therethrough by effecting the formation of a filter cake composed of such solids around the outer surfaces of the fibrous covering, the desired passage of the solid free liquids through said covering and thence longitudinally through the cores of such filtering media to a filtrate outlet.

In a preferred form of the present invention, my improved filtering medium comprises a core composed of hemp fibers which are enclosed in a wrapping of paper applied spirally around the fibers composing the core so that when used in a pressure filtering system, the said medium will present an extended filtering area since substantially the full length thereof is available for filtering purposes.

Another outstanding object of the present invention is to provide a filter or filter medium from which accumulated solids or filter cake may be discharged following a given period of operation and filtering capacity thereby renewed to a high percentage of efficiency. The attainment of this object has been particularly difficult and complex when it is considered that the liquids or oils undergoing filtration contain large quantities of particles of colloidal size. The cake from my new filtering medium may not only be discharged but because of the peculiar form of the medium, the porosity of the paper may be maintained to a high percentage of its original by forcing a gas and/or filtered liquid in a reverse direction to that of filtration, thereby causing the loosening of the cake on the external surfaces of the filtering medium to maintain or restore its efficiency.

Other objects of the invention are: To actually remove the solids from crank case oil in one pass, the improved filtering medium being of such construction that it will produce a brilliant filtrate substantially instantly or just a few minutes after filtration begins without first coating the surfaces of the filter medium with what is known as a pre-coat or filteraid; the provision of a filter which when attached to an engine will employ a sufficiently low flow of crank case oil therethrough so that the full oil pressure of the engine can be applied to the filter medium at a temperature of 140° F. or above, and so that a quantity of oil will pass through the filter which will be small enough not to disturb the pressure on the moving parts or the temperature of the crank case oil in the engine, and yet the filter will have sufficient area and produce such a brilliant oil that it will remove more dirt than filters of which I have knowledge and keep the oil cleaner in an engine over a long period of time; the provision of an improved flexible filtering medium that will bend under pressure without breaking as the filter cake is formed; the provision of filter media which will possess more square feet of area per unit volume than filter media heretofore employed in analogous filtering systems; and the provision of a filtering medium which can, if desired, be discharged a number of times and reused but which because of its simple construction and low cost, may be economically replaced when renewal or restoration eventually becomes necessary.

For a further understanding of the invention, reference is to be had to the following description and the accompanying drawings in which:

Fig. 1 is a side elevation of an internal combustion engine, provided with the oil filtering system comprising the present invention;

Fig. 2 is a longitudinal sectional view taken through the water-jacketed filter shell employed by the present invention and disclosing more particularly the novel filter media disposed therein;

Fig. 3 is a transverse sectional view taken through the shell on the line III—III of Fig. 2;

Fig. 4 is a longitudinal sectional view taken through a dischargeable type of filter containing the filter media forming the present invention;

Fig. 5 is an enlarged longitudinal sectional view of the preferred form of filter media used in the present invention, wherein said filter media partakes of the form of a spirally applied outer wrapping of paper and a core composed of hard fiber or wire;

Fig. 6 is a transverse sectional view on the line VI—VI of Fig. 5;

Fig. 7 is a transverse sectional view of a modified form of filter medium used by the present invention wherein the core of said medium comprises a metallic tube formed with a longitudinal channel;

Fig. 8 is a longitudinal sectional view of a further form of filter medium composed of a core made of a flat metal strip formed into helical coils, the edges of adjoining coils being slightly spaced to produce drainage openings;

Fig. 9 is a longitudinal sectional view of a further modified form of filter medium wherein the core is composed of a coiled round wire spring;

Fig. 10 is a similar view disclosing a further modified form of core wherein the latter is composed of a granular or crystalline substance;

Fig. 11 is a vertical sectional view of apparatus suitable for use in discharging accumulated filter cake from the external surfaces of the filter media employed by the present invention;

Fig. 12 is an enlarged vertical sectional view disclosing the manner of mounting and connecting the ends of the filter media with the head containing a filtrate outlet.

In the drawings, the numeral 1 refers to the oil pervious wrapping or wrappings of the filter media through which the oil or other liquid is forced and which retains the solids on the outer surfaces of the filter media, and the numeral 2 designates the cores of such media. A preferred application of my filter media resides in its use as an attachment filter to remove the solids from the circulating crank case oil of an internal combustion engine without requiring the removal of the oil from the general circulating system of the engine. One form of such a filter in which my invention is employed is disclosed in Figs. 1 to 3 inclusive.

In Fig. 1, the internal combustion engine is designated at A and is provided exteriorly with the filter disclosed in its entirety by the numeral 3, the said filter being suitably mounted and supported in connection with the engine. The engine may be of the usual type having a crank case 4 containing the main body of circulating oil which is forced to the bearings and other movable parts by means of the conventional engine driven pump, not shown. A branch from the oil line, such as the oil pressure gage line, is connected to the filter inlet 5 by means of the connection 6 and the tube or pipe 7. The filter outlet (filtrate connection) 8 is connected by means of the tube 9 to a fitting 10, disposed either above or below the level of the oil within said crank case or to an engine part requiring a small amount of lubrication. A check valve may be placed in either the line 7 or 9, or in any other suitable location, to prohibit the solid-containing oil from draining back into the crank case oil when there is no pressure on the filter.

A water jacket 10a which surrounds the inner shell or the side walls of the filter, is connected by means of pipes or tubes 11 and 13 through connections 15 and 16 to the water or cooling fluid provided in the cooling system of the engine. In general, the opening 12 from which the water is removed from the engine to the filter may be located in the cylinder head or water outlet of the engine. If the engine is equipped in its cooling system with a thermostat, the connection 12 should precede the thermostat with respect to the direction of water circulation. The opening 14 through which the water is removed from the filter to the engine cooling system is located on the suction side of the water pump. By this manner of installation, a small pressure exists at 12 and a partial vacuum at 14, the total differential pressure causing water to circulate through the water jacket 10a of the filter. The temperature of the filter may be controlled by the size of the water tubing and the location of the opening 12, but ordinarily the maximum temperature is desired and for this reason I employ ¼ inch outside diameter to ⅜ inch outside diameter tubing with satisfactory results.

With this arrangement, a small portion of the oil circulated in the engine is by-passed through the filter and then returned to the engine. With my filter media, which removes the solids in one passage of the oil through the filter, much smaller quantities of oil need be by-passed than is necessary with filters of greater porosity, so that full oil pressure may be maintained by the oil pump of the engine on all relatively moving parts requiring lubrication.

In adapting the bundle 17 of the core-twine constituting the filter media to the filter shell, the said core-twine is preferably made with a drainage core which will permit the use of twine in lengths equal to twice the length of the filter or longer. The size of the twine will be in accordance with that of economy and areas obtainable but ordinarily will be between 1/32 and 1/8 inch outside diameter. The smaller the core twine used, the greater will be the capacity of the filter. In Fig. 5, a core twine with one wrapping of paper and a hard fiber or wire core is shown. The wrapping may be of any paper or other thin fibrous covering selected for its porosity and is preferably applied to the core in strips. Either one or more thicknesses may be slit and wrapped around the core to cover it, each lap slightly overlapping the previous turn. Ordinarily, a ream of 480 sheets of 24 inch by 36 inch weighing 20 to 50 pounds of kraft paper is satisfactory, or other papers may be employed such as rag base papers, it being wrapped rather tightly onto the core. One wrapping should be sufficient for attachment filters but more may be used if desired. Each lap of one wrapping should overlap the previous lap to prevent dirty oil from leaking or seeping into the filtrate.

The hard fiber core is one which may be readily used, such a core being obtained from sisal hemp, although the fibers may be of manila or jute. Other types of cores may be used; for instance, in Fig. 7 there is disclosed in transverse section a metallic tube 17' provided with a narrow longitudinal opening or slit 18, which tube will effect the support of the paper and allow seepage of filtrate into the longitudinal channel of the tube. To enter the slit or channel 18, the filtrate easily follows the paper around the outer surfaces of the tube. In Fig. 8 there is disclosed a modified form of filter medium or core twine provided with a core made by twisting a flat thin metallic strip of substantially 1/16 of an inch in thickness until the tubular spiral shape is formed. If soft flat wire is twisted, it makes a spiral shape until the sides of adjoining coils touch each other. Untwisting slightly, the sides become separated, and this should be done sufficiently to allow a small opening such as disclosed at 19 for seepage of the filtrate into the inner channel. The separation of the coils or untwisting should not be carried out to such a point that the core will not properly support the paper covering. In Fig. 9, there is disclosed a core-twine made of small round wire fabricated into a coil and in Fig. 10, the core is formed from granulated, crystalline or reduced materials, such as kieselguhr, sawdust, glass wool or certain types of infusorial earths which may or may not be treated chemically.

A desired number of core-twines of predetermined lengths may be bunched together in connection with the filtrate outlet tube 21 and the ends 20 of the looped core-twines and the inner end of the tube 21 may be protected from the cementing operation, hereinafter described, to produce a common passage or opening by which the ends 20 of the core-twines relatively communicate in order that the filtrate discharged from the cores 2 of said core-twines may, without coming into contact with "dirty" oil, be led to the tube 21, discharged from the filter and returned to the crank case at the fitting 10. To seal the ends 20 of the core-twines to provide for their desired communication with the tube 21, several different methods of construction may be employed. I have found it a satisfactory and economical practice to employ a cement to accomplish this purpose which resists the actions and temperatures of the liquids encountered in the operation of the filter. Thus in a preferred form, the ends 20 of the core-twine bundle 17 and the inner end of the tube 21 may be protected from the cement (if the ends of the twine were not protected from the cement, the cement would seal the ends of each filter element, making it useless), a phenol-formaldehyde resin, through the employment of a high melting point solid such as chlor-naphthalene wax, melting at about a temperature of 240° F. by dipping these core twine and tube ends in the wax when the latter is in a melted state. The exposed portion of the wax is then covered with one or more cloth cups after the wax has solidified. The wax is covered with a cloth which is later soaked with the cement and becomes embedded in it.

When using cores of granular materials such as is disclosed in Fig. 10, there may be a tendency for a very minute amount of the core to leave the twine and contaminate the filtrate if provision is not made to prevent it. Consequently when such cores are used, two cloths are employed. One cloth, or fine wire mesh screen, is set in the walls so that it covers the ends 20 of the core twines but does not cover the end of the tube 21, and extends above the wax so that all edges of the cloth will be embedded in the cement. This cloth, therefore, acts as a barrier to any small particles which may leave the core (from which extremely small particles are excluded) as all filtrate must pass through the cloth before entering the outlet tube 21. A fine wire screen soldered in the inlet end of the tube 21 would offer further protection.

Any cement which will withstand the temperatures and liquids encountered during filtration may be used and I do not limit myself to any particular type of cement. In the preferred form which I have used, a phenol-formaldehyde resin (e. g. bakelite Br-0013 and Br-0014 mixture) of the proper viscosity is added to a close fitting wax, glass or polished steel form and the walled core-twine assembly with cloth cup is added thereto at the proper temperature. More cement may be added to the form until the wax is completely surrounded with cement. The whole assembly is then baked until the cement polymerizes and becomes hard. The baking temperature should be properly controlled. Temperatures of 165 to 185° F. when starting to 260° F. at the end have proven quite satisfactory. After baking, the wax may be removed with hot oil although this is usually unnecessary because during baking the wax disappears at higher temperatures above its melting point from the space occupied by it before adding the cement through evaporation and/or absorption into the core-twines. The finished core-twine assembly, it will be noted, is self contained and may be placed in any kind of a liquid-tight container by simply attaching the outer end of the tube 21 by means of a pressure-tight connection through the end of the shell. When the whole filter is to be discarded after use, the shell will be made of galvanized or other sheet metal because of its cheapness. However, when the core-twine assembly only is to be discarded after use, the shell may be made with a removable end through which the outer end of the tube 21 may be connected by a pressure-tight joint.

The filter is preferably heated with the water jacket as disclosed in Figs. 1 to 3, the water circulating in either direction through the jacket 22 surrounding the filter shell walls 23 as disclosed, or surrounding said walls and ends. While this construction is preferred, it will be understood that the invention is not limited to the step of heating the oil in the filter shell. For instance, thermostatic control of the oil temperature in the filter may be employed. The filter may be heated by placing it in a warm place, unfiltered oils surrounding the core twines may be returned to the crank case possibly through the pressure relief valve in the oiling system so that the filter will warm sufficiently from the warm crank case oil coming into it to control filtration.

When attaching the filter to engines carrying low pressure on the engine oiling system, but equipped with positive action pumps, a pressure relief valve in addition to any that may already be in the oiling system, may be used to secure a high oil pressure to feed the filter while not disturbing the pressure in the oiling system. In this instance, the filter is fed from the high pressure side of the auxiliary loaded valve which is placed in the main supply from the pump.

As the attachment filter is used, it removes all solids from the circulating oil including colloidal carbon. If the oil and carbon is burned from the cake, an appreciable quantity of sand, dust and iron cutting is obtainable. This material is abrasive, will scratch glass, and constitutes the chief reason, it is believed, for wear of the moving parts in the motor. Theoretically there is never metal to metal contact with a film of oil between moving surfaces of a bearing. The presence of dirt, however, allows metal to dirt contact with resulting wear on the metal.

The attachment filter shown in Figs. 1, 2 and 3 does not provide for renewal of the filter media. Because of its essential cheapness, this construction is preferable in many instances. However, the shell can be made with a removable end and in this case a filter media assembly may be replaced when the filter is full of cake, or the filter media assembly may be cleaned to varying degrees of success by washing with gasoline or kerosene while blowing air in a reverse direction to that of filtration. The filter medium assembly in this instance may be removed from the filter shell.

In another adaption of my invention which is as important as non-dischargeable attachment filters is the dischargeable filter. For instance, the oil may be removed from the engine and filtered through my improved filter medium by means of pressure or vacuum. The filter may be heated in this use with hot water, steam, gas or electricity.

Fig. 4 shows a preferred form of filter designed to filter used crank case oils so that the cake may be discharged without opening the filter and a rate approaching that of the previous cycle obtained. In Fig. 4, the filter shell 27 is heated by means of electric heaters or heater coils 28 controlled by a thermostat 29 with the bulb located near the heaters to control the temperatures between 140 and 185 degrees F. A desired number of core twines 1, the number depending on the cycles desired, the amount of dirt in the oil, the size of the core twines, and economy, with the open ends cemented at the same end as the outlet of the filter, so that the said ends are in open communication with the outlet 26 of the filter, are placed as an assembly within the filter shell 27. The outlet tube or pipe of the filter 26 is fastened by means of a pressure tight joint to the removable lid 32, which is fastened by means of bolts and a gasket to the flange 31 and which, in turn, is fastened in a liquid-tight manner to the filter shell 27. The dimensions of the filter shell are optional but it should be long enough even if it has a small volume. It and element 28 are surrounded with insulation 34, an insulation cover 35 and the whole filter supported to a wall or standard by means of brackets 36.

Besides the filter outlet 26, there are three openings in the filter shell 27, to wit, the feed connection 25, the sludge outlet 37 and the sludge inlet 38, each of which is controlled by a suitable valve. The sludge outlet 37 is, in turn, connected by means of a pipe to an oil-separator 39, which is connected to a T-fitting 39', one opening of which is controlled by the sludge drain valve 41 while the other leads to a sludge pipe valve 42, connected to the sludge pipe 43. The sludge pipe has two other openings, the one mentioned above at the sludge inlet 38 to the filter, and the other connected at the air supply and controlled by the air valve 44. The whole filter is mounted in a preferably inclining position with the oil separator end slightly elevated.

The operation of this type of filter is as follows: Used crank case oil, contaminated with dirt, colloidal carbon and the like, is introduced into the filter under pressure from a pump or montejus at filter inlet valve 25 (effective filtering pressure may be secured by applying vacuum at filtrate outlet 26) and is forced through the filtering medium 1, the solids remaining on the outside of said filtering medium and the cleaned filtered oil passing through it. Entering the core of the core twine, the oil is carried without contamination with dirty oil to the filter outlet 26 through the three way valve 45 and through the filtrate pipe or tube 24 to a desirable storage. During this filtering cycle, the filtrate is kept at a temperature of about 160 to 180° F. After the oil ceases to filter at an economical rate, the cake may be discharged as follows: The feed valve 25 is closed and the valves 37 and 38' opened. The sludge pipe 43 is partially filled with sludge from a previous cycle. With the valves 37 and 38' opened, the pressure in the filter is released so that filtrate and a gas may be forced through the filter medium in a direction opposed to that of filtration. To do this, the three-way valve 45 is turned to admit compressed air or other gas at 30 to 120 pounds per square inch pressure to the cores of the core twine. An appreciable amount of filtrate and then gas passes through the filtering medium from the inside out. Because of the small diameters obtainable with my core twine, the paper or other equivalent covering will allow very high blow-back pressures which open the pores of the filtering medium covering 1 and allow the filter to be frequently discharged. The reverse air flow is stopped by closing the sludge outlet valve 37 and air valve 44 is opened. This allows 100 to 120 pounds air pressure on the sludge pipe and filter, so that when the sludge valve 37 is suddenly opened, which is the next operation, the sludge is forced at a high velocity along and across the filter medium while there exists a pressure within the core. This flushing at high velocity removes the cake from the filtering medium and it passes with some hot oil to the oil-air separator 39. The blow and flush may be repeated. Sludge is drained from the system at 41 after filling sludge pipe 37 for discharge at the end of the next cycle and the cycle is renewed.

A simplified form of such a discharging filter may be used by eliminating the sludge pipe and the oil-air separator 39, and by using an extremely long filter 27. With this method the same flush is secured with the exception that some cake near filtrate outlet ends of twines is not discharged. If the filter is long, the percentage loss is not great. Such a filter may be attached to a truck, tractor, or Diesel engine and the filtrate outlet then should be slightly higher.

Similar apparatus may be adopted to filter out solids from other liquids. In some instances, the cake may be flushed with a liquid other than the sludge. For example water may be used when filtering aqueous solutions.

In the form of my invention disclosed in Figs. 11 and 12, a simple form of discharging filter has been shown. In Fig. 11, a filter media I' do not have the appearance of twine as they are comparatively stiff and straight. Such filter media may be made by covering a stiff and straight core such as a slotted tube as shown in Fig. 7 with paper applied in a spiral turn or wrap. The paper may be rolled around the core in short lengths and cemented at the edge, or wrapped with string or the like to keep it from unrolling in the filter. Again, cloth may be applied to the metal core and then wrapped with paper. In this construction, the cloth supports the paper during filtering and supplies drainage to the slot in the metal core. An alternate form resides in applying a paper to the tubular metal core followed by a wrapping of cloth. In this form, the cloth supports (holds in) the paper during the gas flow to discharge the filter cake while another form resides in first wrapping the core with cloth using an intermediate layer of paper and an outer layer of cloth.

Several wrappings of paper (or a single wrapping of heavy paper) are needed to insure the cleanest filtrates over a period of use of weeks or months. In Fig. 11, the filter medium such as above described is spaced evenly in the cement indicated at 47, placed in the filter shell 46, and so constructed that the open ends 48 are in communication only with each other and the filter outlet 50. The cement may be reenforced with a wood base 54 to withstand the pressure during blow back. By making holes in the protecting medium (chlor-naphthalene wax has been used as above) the wood 54 becomes attached in various spots to the cement 47 to add further strength to both wood and cement.

The filter shell may be heated in any definite manner. In Fig. 11, an electric heater is shown at 58 and for crank case oil filtration, the temperature is controlled at approximately 180° F. by a thermostat. The flange 57 on the shell 46 is bolted to the lid 55 and a pressure-tight connection made by the gasket 56. The outlet 50 is fastened by a removable connection through the lid 55 and to a three-way valve 59. The whole filter is insulated at 60 and insulation covered with a container 61 and lid 62.

In operation, the dirty oil is fed to the filter through the feed valve 63, pressure being supplied by motejus or pump or by vacuum applied at the filtrate outlet 53. The oil is thereby forced through the filter media, the solids remaining on the outside and the clean brilliant oil passing through the outlet 53 to a suitable container. Filtration is continued through the desired cycle but not long enough for the cakes to build together between the filter media. The cake is then discharged as follows: Allow the unfiltered oil in the filtered shell 46 to drain to the motejus through the line 63 or into another receptacle through the sludge drain valve 64. Open the valve 64 and turn the three-way valve 59 to admit compressed air or other gas through pipe 52. This permits of a reverse flow and flow in the opposite direction to that of filtration. The liquid in the dome 50 (which may be larger to accumulate more filtrate) is first forced through the filter media followed by the gas. The cake is discharged into the sludge receptacle placed under the outlet 64 and the filter is ready for another cycle.

The filter media may also be discharged by removing the lid 55 from the shell 46 and discharging the media in the open by reverse gas pressure, as indicated above. When this occurs, no action is visible as long as liquid remains in the dome 50 and cores of the filter media, but as soon as the gas reaches the core, it begins to force through the filter media surface (paper) in the form of a foam, and the cake slowly and positively drops off the exterior surfaces of the filter media. This action usually requires from one to three minutes and the paper covering regains a rather new appearance in spite of having been previously covered with the dirtiest kind of a filter cake. The fact that the cake breaks away from the filter media is of great importance, as this is responsible for the successful discharge of the cake. It will be observed that in the construction disclosed in Fig. 11, the flushing of the filter media is unnecessary, as when using the type of equipment disclosed in Fig. 4. Flushing is unnecessary for complete removal of the cake if adjacent filter media are spaced far enough apart to prevent the cakes from building together.

Any core with good drainage permits discharge of the filter media, i. e., the removal of cake. For instance, sawdust when used in the cores of the filter media will discharge cake very nicely without flushing providing the filter cake does not build together. In Fig. 11, the lower ends 65 of the filter media are sealed with a suitable cement such as a phenol formaldehyde resin, after the drainage core has been pinched together at such lower ends.

In Fig. 12, there has been disclosed in vertical section the cemented portion of a filter showing a protecting screen or cloth to preclude any possibility of granulated core (such as sawdust) passing with the filtrate through the outlet tube 21'. In this figure, the ends of the filter media communicate only with each other and the lower outlet 21, the same being set in the cement 68. An inner cloth 66 (or screen of very fine mesh) covers the ends of the filter media but does not cover the end of the outlet tube 21'. It is necessary for the filtrate to pass through this cloth or screen 66 before entering the outlet tube 21'. The cloth 66 is protected during the cementing operation by setting it in the wax with the filter media and the drainage screen 70 which is a large or coarser mesh screen. The regular outer cloth 69 setting in the cement is also used.

The advantages of my invention over prior filters may be summarized as follows: Larger areas may be installed in a container of given unit volume. Thus when filtering as a cake increases in thickness, it resists the flow or slows down the rate of filtration, and the thicker the cake is, the slower is the rate of filtration. Large filtering areas are therefore advantageous because the cake formed is much thinner when spread over a large area than when over a small one. For this reason, filters made with large effective filter areas maintain a more constant flow throughout their life than filters with small filter areas. Also large areas give a greater capacity per filter than small areas, other conditions being equal.

| Kind of filter medium | Outside diameter (or size) of core-twine (inches) | Effective square feet of filter area per 1 cu. ft. container | Volume in cu. ft. occupied by filter medium in 1 cu. ft. container |
|---|---|---|---|
| Core-twine | ¼" O. D. | 72 | 0.41 |
| Do | ⁵⁄₃₂" O. D. | 114 | 0.41 |
| Do | ⅛" O. D. | 142 | 0.41 |
| Do | ³⁄₃₂" O. D. | 190 | 0.41 |
| Do | ¹⁄₁₆" O. D. | 285 | 0.41 |
| Do | ¹⁄₃₂" O. D. | 570 | 0.41 |
| Fibrous washer | Washers 1⅝" O. D. | 5 | 0.167 |

Because my filter media removes the dirt in one pass, when used in an attachment filter, the circulating oil in an internal combustion engine is maintained in a cleaner condition and more dirt is removed from the engines than when filters are used which pass dirt through the filter media. Tests have shown that a filter which removed all dirt in one pass, removed 50 times as much dirt as a filter which did not remove all the dirt at one pass, although the latter filter had a rate of more than 800 times the former. The oil in the crank case was naturally kept much cleaner by the former filter. As contrasted to centrifuges, my filter media have no moving parts in addition to those on the engine and experienced labor is not required for their care.

I am aware of the fact that paper has been used as a filtering medium before but not to my knowledge in the forms and manner here disclosed. The advantage of this construction over constructions of the prior art is that larger areas are obtainable, and a high blow-back pressure can be used. My improved filter media are not fragile but in the main are flexible or pliable and if for any reason the paper covering should be destroyed, the openings in the core are so small that loss of oil pressure would not result and the engine would be protected. Moreover, the filter media are light in weight and may be employed for long operating cycles.

A most important feature of the present invention is the adaptability thereof to the discharge of the cake formed on the filter media and the efficiency of this discharge, the same being as high as possible with any filter medium of which I have knowledge. It is comparatively easy to discharge coarse solids from a coarse or fine filter media by blowing off the filter cake with the assistance of a scraper. The scraper in all instances should never "smear" the cake into the filter media. Even with coarse solids, coarse filter media and an ideal discharge, filter media such as cloth as now used in industrial filtration, the rate of the second cycle after cake removal never equals that of new filter media. The rate falls off in succeeding cycles until it frequently reaches a constant with coarser solids.

The discharge of fine solids, however, is extremely difficult and I know of no other filter media now commercially available, except the fibrous washer type, which will discharge these fine solids so that the filter media may be used continuously.

In my invention, the finest solids may be discharged, those solids which, in fact, plug or obstruct other filter media. Of these solids, crank case oil solids are the most difficult to handle. Because of the ability to discharge the cake (which is due to the ability to blow back with high pressures through the filter media), because of the exceedingly large area obtainable, and because of the essentially low cost of my filter media, new filtration fields are made possible thereby on a commercial basis which heretofore have been considered impracticable.

In this specification, I have referred to the covering employed on the filter media as being composed of a thin-walled fibrous material of imperforate form. It will be understood, however, that this covering may be applied to the cores in one or more thicknesses depending upon the requirements of the fluids undergoing filtration. Paper is of course porous or pervious to the passage of fluids under the conditions specified and the terms used in defining the filtering covering are intended to cover paper or other equivalent material having the properties specified.

What is claimed is:

1. A filter element comprising a core composed of granular material, and a thin-walled imperforate covering of fibrous material closely applied by spiral wrapping to the walls of said core.

2. A flexible filter element comprising a twine-like body having a core composed of hemp fiber retained in an outer tubular fibrous covering pervious to the passage of fluid and closely applied to the walls of said core.

3. A flexible filter element comprising a twine-like body having a core composed of a reduced granular material, and a spirally wrapped covering of a fibrous material closely applied to and surrounding said core.

4. A filter comprising a casing having a fluid receiving chamber, filter media disposed in said chamber composed of a plurality of flexible looped twine-like elements embodying paper covered cores, a supporting head in which the ends of said elements are embedded, said head being provided with a chamber in open communication with the ends of said elements, and a filtrate outlet leading from the chamber of said head.

5. In a filter, a casing provided with a fluid receiving chamber, filter media arranged in said chamber comprising a multiplicity of flexible paper covered tubes looped upon themselves and flexibly arranged in said chamber, and a rigid filtrate outlet leading from said casing, said outlet being in direct communication with the ends of said tubes.

6. A filter comprising a casing having a fluid receiving chamber, filter media disposed in said chamber composed of a plurality of flexible looped twine-like elements embodying paper covered cores, a supporting head in which the ends of said elements are embedded, said head being provided with a chamber in open communication with the ends of said elements, a filtrate outlet leading from the chamber of said head, and means for heating the fluids contained within the chamber of the filter casing.

7. A filter comprising a casing having a fluid receiving chamber, filter media disposed in said chamber composed of a plurality of flexible looped twine-like elements embodying paper covered cores, a supporting head in which the ends of said elements are embedded, said head being provided with a chamber in open communication with the ends of said elements, a filtrate outlet leading from the chamber of said head, and means for circulating a heated liquid around the walls of said filter chamber to maintain the fluids undergoing filtration at an elevated temperature.

8. A dischargeable filter element comprising a tubular core having means to permit filtrate to enter therein, and a plurality of porous wrappings covering said core one over the other, the outer wrapping having the fine porosity of paper, the entire element being capable of discharging filter cake when filtrate and gas are forced therethrough in a direction opposite to a filtering direction, the inner wrapping being highly porous and forming a drainage member between the outer wrapping and the tube.

DONALD H. WELLS.